United States Patent
Eriksen et al.

(10) Patent No.: US 8,721,258 B2
(45) Date of Patent: May 13, 2014

(54) WIND TURBINE

(75) Inventors: Uffe Eriksen, Horsens (DK); Thorkil Munk-Hansen, Give (DK)

(73) Assignee: Siemens Aktiengesellschaft, Munich (DE)

( * ) Notice: Subject to any disclaimer, the term of this patent is extended or adjusted under 35 U.S.C. 154(b) by 454 days.

(21) Appl. No.: 13/031,783

(22) Filed: Feb. 22, 2011

(65) Prior Publication Data

US 2011/0211955 A1 Sep. 1, 2011

(30) Foreign Application Priority Data

Feb. 26, 2010 (EP) .................................... 10154875

(51) Int. Cl.
*F03D 11/04* (2006.01)

(52) U.S. Cl.
USPC .......................................... 415/4.3; 415/4.5

(58) Field of Classification Search
USPC ............... 415/4.3, 4.5, 220; 294/81.21, 81.54
See application file for complete search history.

(56) References Cited

U.S. PATENT DOCUMENTS

| | | | |
|---|---|---|---|
| 7,431,567 B1 | 10/2008 | Bevington et al. | |
| 7,789,252 B2 | 9/2010 | Dehlsen et al. | |
| 8,172,100 B2 * | 5/2012 | Kappel et al. ................. | 212/323 |
| 2007/0200103 A1 * | 8/2007 | Viladomiu i Guarro et al. ............................. | 254/334 |
| 2008/0245756 A1 * | 10/2008 | Dehlsen et al. ............... | 212/224 |
| 2010/0011575 A1 | 1/2010 | Numajiri | |

FOREIGN PATENT DOCUMENTS

| | | | | |
|---|---|---|---|---|
| CN | 101310107 A | 11/2008 | | |
| EP | 1101934 A2 | 5/2001 | | |
| EP | 1101936 A2 | 5/2001 | | |
| EP | 1291521 A * | 9/2001 | ............. | F03D 11/00 |
| EP | 1284365 A2 | 2/2003 | | |
| WO | WO 2007096008 A1 | 8/2007 | | |
| WO | WO 2008155983 A1 | 12/2008 | | |
| WO | WO 2010031528 A2 | 3/2010 | | |

* cited by examiner

*Primary Examiner* — Edward Look
*Assistant Examiner* — Juan G Flores

(57) ABSTRACT

A wind turbine having a nacelle being rotatably disposed on a tower is proposed. The nacelle has a first cavity, a generator housing portion disposed upstream to the nacelle having a second cavity, a hub disposed upstream to the generator housing portion with attached rotor blades at it having a third cavity. The first, second and third cavities communicates with one another. A rail-system has at least one rail-element having a device for lifting and/or transporting. The device for lifting and/or transporting is movable along the rail-system. The rail-system at least partially extends through at least two adjacent cavities.

10 Claims, 4 Drawing Sheets

WIND TURBINE

CROSS REFERENCE TO RELATED APPLICATIONS

This application claims priority of European application No. 10154875.8 filed Feb. 26, 2010, which is incorporated by reference herein in its entirety.

FIELD OF THE INVENTION

The invention relates to a wind turbine comprising a nacelle being rotatably disposed on a tower.

BACKGROUND OF THE INVENTION

The use of wind turbines to harness wind energy in order to generate electrical power represents an essential part of incorporating renewable energies in the energy-mix. A typical wind turbine is known from U.S. Pat. No. 7,431,567 B1 comprising a tower with a first cavity, a turret pivotably attached to the tower with a second cavity, a spindle attached to the turret with a third cavity, a wind rotor hub rotatably attached to the spindle with a fourth cavity, with the cavities communicating with one another such that an average-size man can move through the cavities.

Maintenance of such wind turbines is a considerable factor in the total cost and effort of any project. Heavy components in a wind turbine such as yaw motors, hydraulic or brake components, etc. are typically handled or replaced due to mal-function or age for instance. Therefore, external cranes and hoist mechanisms are used when a wind turbine is undergoing service inspection or repair. Such cranes are large and bulky, so that they are not sufficiently efficient for lowering the parts from the nacelle frame of the wind turbine and hoisting them back to the nacelle frame. Besides, these cranes are expensive so that only a small number of the cranes are available for each wind turbine having parts to be handled.

Attempts for overcoming such problems have been proposed consisting in providing a crane fixed or detachably installed inside a nacelle frame.

EP 1 291 521 A1 refers to a wind turbine whereby the nacelle is provided with an overhead frame from which the generator is suspended and doors at the bottom of the nacelle.

EP 1 101 934 A2 depicts a wind turbine having a movable on-board crane on a mounting, which has a load receiver. The mounting can move along the machinery casing, carrying e.g. the generator or the transmission. There is an aperture in the bottom of the machinery casing part projecting radially from the tower.

US 2007/0200103 A1 refers to a wind turbine with a nacelle frame and a first hoist permanently mounted to the frame being movable along the nacelle frame by use of wheels or rails. The first hoist is adapted to hoist a second, more powerful hoist and crane on the frame, with the second hoist and the crane being removably mounted on the nacelle frame as well. Further, by using the second hoist and the crane, a winch is hoisted on the frame and removably mounted to it.

The systems known from prior art are either not flexible in terms of degrees of freedom of movement of heavy components within the nacelle or the upper part of the wind turbine in general or relatively complicated regarding their assembly.

SUMMARY OF THE INVENTION

It is an object of the present invention to provide a wind turbine capable of easily moving heavy components over a wide range within a turbine housing having a simple built-up.

This is achieved by a wind turbine comprising a nacelle being rotatably disposed on a tower with the nacelle having a first cavity, a generator housing portion disposed upstream to the nacelle having a second cavity, a hub disposed upstream to the generator housing portion with attached rotor blades at it having a third cavity, whereby the first, second and third cavities communicates with one another, and a rail-system comprising at least one rail-element having a means for lifting and/or transporting, the means for lifting and/or transporting being movable along the rail-system, wherein the rail-system at least partially extends through at least two adjacent cavities.

The inventive wind turbine facilitates moving heavy components through at least two adjacent cavities communicating with one another by use of the rail-system comprising at least one rail-element having a means for lifting and/or transporting. It is possible, that the first cavity of the nacelle and the second cavity of the generator housing portion disposed upstream to the nacelle comprise the rail-system. Thus, heavy components are easily and fast movable from the first to the second cavity and reversely. Likewise, it is possible, that the rail-system extends from the second cavity to the third cavity of the hub disposed upstream to the generator housing portion. Accordingly, heavy components may be transported from the second to the third cavity and reversely. The rail-system may partially or completely extend through one or both of the cavities.

The rail-system comprises at least one rail-element. The rail-element is adapted to host the means for lifting and/or transporting. The means for lifting and/or transporting may be detachably attached to the rail-system giving rise to a quick and easy detachment when the wind turbine operates and further installation when needed as in case of service and repair. Moreover, it is possible to easily switch between different means for lifting and/or transporting in such a manner. Movement of the means for lifting and/or transporting along the rail-system may be realised by manual or engine-driven driving means such as motors incorporating wheels or gear-wheels for instance. The rail-element may be made of an appropriate iron-based material for example and is securely mounted to the according cavities.

If longer distances for the transport of components may be necessary, it is preferred, that the rail-system extends from the first through the second to the third cavity, that is through all cavities, thereby permitting the heavy components to move over a maximum distance. Analogous, the rail-system may extend partially or completely through the cavities, although it is understood that the rail-system completely extends through the second cavity, i.e. the cavity in the middle in this preferred embodiment.

The length of the rail-system may be extendable by adding further rail-elements and/or by a telescopic mechanism. An extension of the length of the rail-system may accordingly be achieved by assembling a plurality of rail-elements forming the rail-system. Thus, the length of the rail-system is essentially defined by the length of the rail-elements incorporated within the rail-system. The rail-elements may differ in their lengths or have the same dimensions. The rail-elements are connected or connectable by locking means giving rise to a stable connection even in cases of heavy loading. Additionally or alternatively it is possible to prolong the rail-system by a telescopic mechanism. The telescopic mechanism allows the movement of one rail-element sliding out from another, thereby lengthening the rail-system from a rest or collapsed state to an extended state.

Preferably, at least one loading opening is disposed in or at the nacelle and/or generator housing portion and/or the hub.

Loading openings facilitate or enable placement of heavy components of the wind turbine into the nacelle, the generator housing portion or the hub respectively depending on where the loading opening is disposed. Preferably, the wind turbine comprises at least one loading opening for the nacelle, the generator housing portion and the hub. The loading openings may be positioned at different or like positions. The dimensions of a loading opening may differ, even though it is understood, that the dimensions of a loading opening permit to insert all relevant components of the wind turbine into the according parts of it.

It is of advantage, when the rail-system is extendable or extends outside the wind turbine through a loading opening of the nacelle and/or a loading opening of the hub. In such a manner with opened loading opening it is achievable that a component may be transported along the rail-system from outside the wind turbine, that is for instance from outside the nacelle, through the first cavity of the nacelle to the second cavity of the generator housing portion and if necessary further to the third cavity of the hub and even outside the hub or vice versa. Hence, heavy components may be moved over a distance from one end outside the wind turbine to an opposite end outside the wind turbine representing an extraordinary long distance of movement of these parts.

All loading openings are closable by a hatch in favour. Hence, the loading openings may only be opened, when the wind turbine is not operating, thereby avoiding undesired air-streams within the wind turbine. The hatch may be closable or lockable by hand or by an automatic, for instance remote-controlled closing and/or locking means.

The rail-system may have at least two different slopes along its length. Consequently, the slope of the rail-system may alternate along its length. For example, a first slope of the rail-system may be provided with the rail-system extending from the hub to the end of the generator housing portion. A second slope, different from the first slope of the rail-system may be provided in the nacelle. Different slopes of the rail-system give rise to a simple physical acceleration or braking of components along different sections or the rail-system, respectively. Emanating from the nacelle for example, negative slopes, that is decline of the rail-system gives rise to an acceleration and easy movement of heavy components towards the hub. Accordingly, such negative slopes of the rail-system impede movements from the hub towards the nacelle. It is of advantage, when the slopes of the rail-system is positive, that is the rail-system ascents towards the endings of the rail-system, thereby avoiding components to slide off the rail-system or slide against other parts of the wind turbine or external apparatuses if need be. Of course more than two different slopes along the length of the rail-system are also possible.

Preferably, the means for lifting and/or transporting is collapsible. Hence, the means for lifting and/or transporting is collapsed when not needed, thereby realising an optimised use of space within the wind turbine. In terms of service and repair the means for lifting and/or transporting is fully employed and in a not collapsed state.

The means for lifting and/or transporting may be a hoist and/or crane. The hoist and/or crane is adapted to lift all heavy components and securely transport them from an initial to a desired end position.

BRIEF DESCRIPTION OF THE DRAWINGS

In the following the invention is described in detail as reference is made to the figures, whereby.

DETAILED DESCRIPTION OF THE INVENTION

Figure 1:
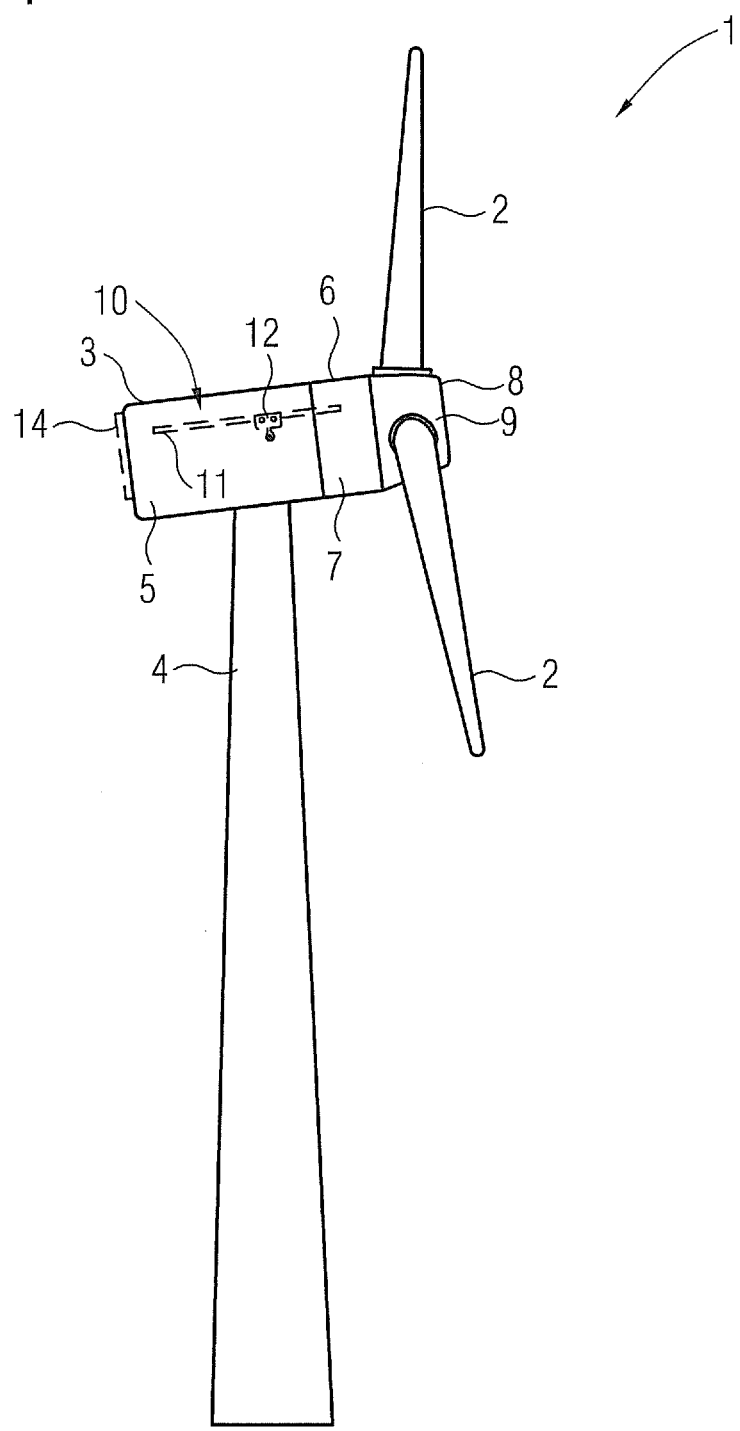
FIG. 1 shows a schematic view of a wind turbine according to an exemplary embodiment of the invention.

FIG. 1 shows a schematic view of a wind turbine 1 according to an exemplary embodiment of the invention. The wind turbine 1 is a direct-drive wind turbine having a reduced number of components and thus a less complex built-up as it particularly does not comprise a gear box. Direct-drive wind turbines have a direct mechanical coupling between the wind rotor hub 8 and the generator (not shown) so that the wind drives the wind rotor blades 2 and the rotor within the generator together as a unit.

The wind turbine 1 comprises a nacelle 3 being rotatably disposed on a tower 4 with the nacelle 3 having a first cavity 5, a generator housing portion 6 disposed upstream to the nacelle 3 having a second cavity 7, a hub 8 disposed upstream to the generator housing portion 6 with attached rotor blades 2 at it having a third cavity 9. The first, second and third cavities 5, 7, 9 communicate with each other. A rail-system 10 (dashed) comprising a rail-element 11 (dashed) partially extends from the first cavity 5 of the nacelle 3 to the second cavity 7 of the generator housing portion 6 building an internal duct-like structure of appropriate height. Dashed lines indicate, that the rail-system, etc. is placed inside the upper part of the wind turbine 1. The rail-system 10 is mounted to a frame-like structure (not shown) within the nacelle 3 extending through the generator housing portion 6. A hatch 14 is positioned at the rear (left) end of the nacelle 3.

To the rail-system 10 or the rail-element 11 respectively is a means for lifting and/or transporting 12 in the shape of a crane attached, which is movable along the rail-system 10 in axial direction. The means for lifting and/or transporting 12 may be detachably attached. Attachment of the means for lifting and/or transporting 12 may only be required in terms of maintenance of the wind turbine 1. During operation of the wind turbine 1 the means for lifting and/or transporting 12 may be detached giving rise to an optimised use of space within the upper part of the wind turbine 1. That means that only components being essential for operation of the wind turbine 1 may be installed in these times.

Figure 2:
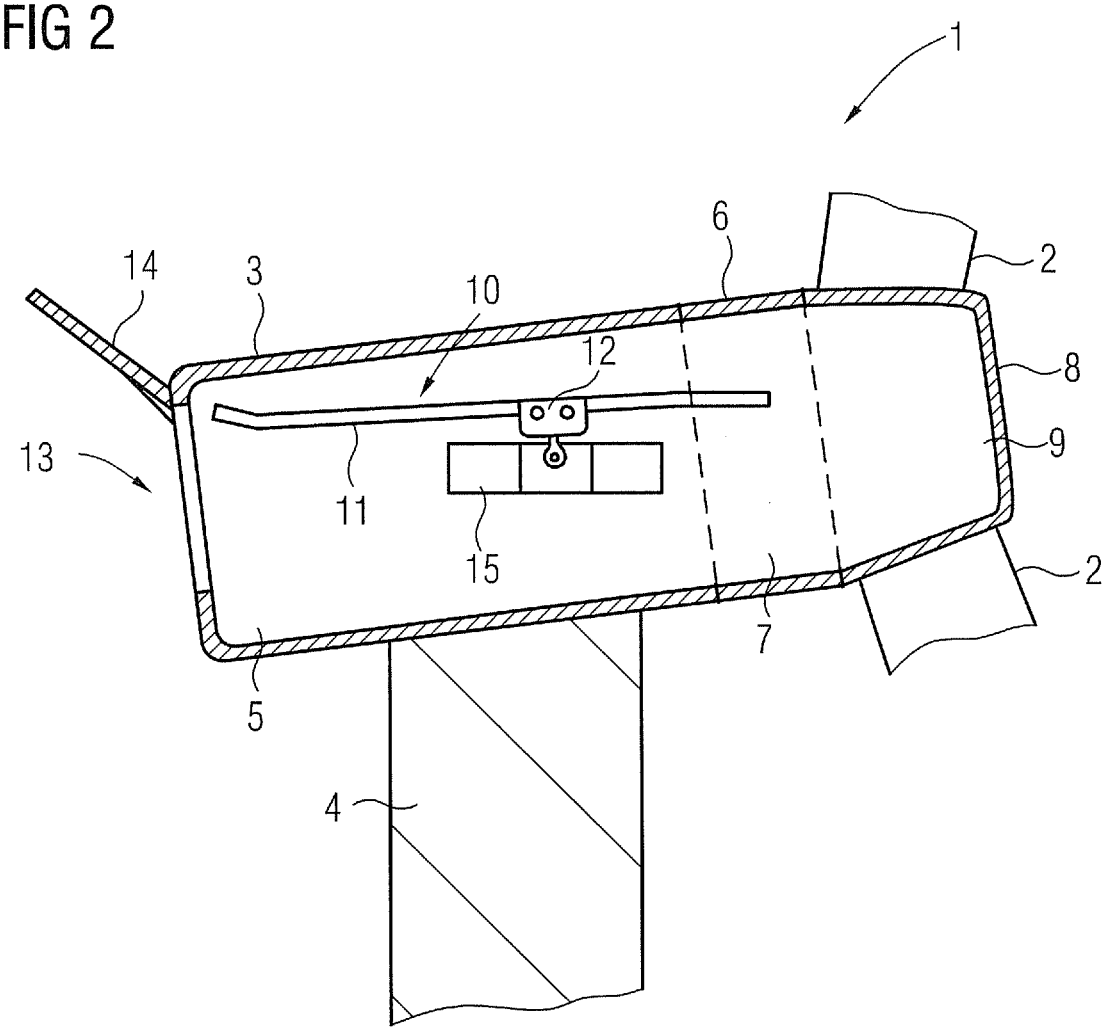
FIG. 2 shows an enlarged principle cut view of the upper part of the wind turbine according to an exemplary embodiment of the invention.

FIG. 2 shows an enlarged principle cut view of the upper part of the wind turbine 1 according to an exemplary embodiment of the invention. It can be seen, that the rail-system 10 i.e. the rail-element 11 begins almost at the rear (left) ending of the nacelle 3 and extends through the first cavity 5 to the adjacent second cavity 7 of the generator housing portion 6. A loading opening 13 is disposed at the rear end of the nacelle 3, which may be closed via a pivotable hatch 14.

FIG. 2 shows the wind turbine 1 in case of maintenance e.g. service or repair works are executed. Here, a pitch actuator 15 originally located in the hub 8 is to be removed. The pitch actuator 15 has already been lifted by a crane represented by the means for lifting and/or transporting 12 and is freely moved or carried by the means for lifting and/or transporting 12 along the rail-system 10 from its position of removal towards the rear ending of the nacelle 3. The means for lifting and/or transporting 12 are driven by an electric motor (not shown). No manual lifting in order to transport the pitch actuator 15 or any other component is required during removal or installation of components.

It is discernible that the rail-system 10 has different slopes along its length. In particular, the rear (left) end of the rail-system 10 has a greater slope than the rest of the rail-system 10 giving rise to decelerating effects during movement of the actuator pitch 15 from right to left i.e. from the generator housing portion 6 towards the rear ending of the nacelle 3. Hence, it is assured, that even if the pitch-actuator 15 or any other component being lifted by the means for lifting and/or transporting 12 would slide towards the rear end of the nacelle 3 deceleration of the sliding component is achieved through the ascent of the rail-system 10 towards the rear (left) end of the nacelle 3.

The means for lifting and/or transporting 12 is collapsible. Consequently, the means for lifting and/or transporting 12 is in its collapsed state during operation of the wind turbine 1 and in its non-collapsed state during maintenance works or the like.

Figure 3:
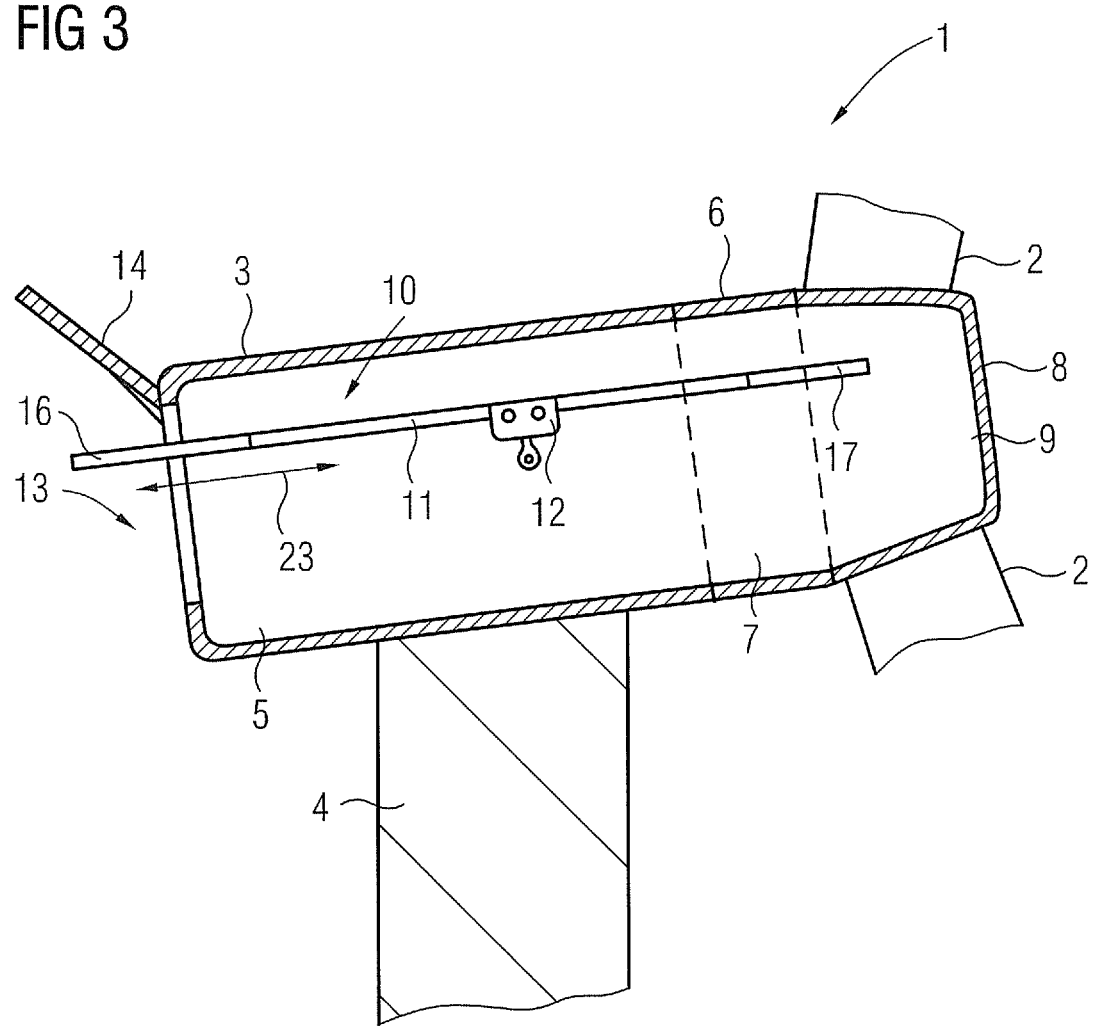
FIG. 3 shows an enlarged principle cut view of the upper part of the wind turbine according to another exemplary embodiment of the invention.

FIG. 3 shows an enlarged principle cut view of the upper part of the wind turbine 1 according to another exemplary embodiment of the invention. In comparison to FIG. 2 the rail-system 10 comprises three rail-elements 11, 16, 17 giving rise to an enhancement of length of the rail-system 10. The rail-system 10 extends through all cavities 5, 7, 9 i.e. components can be moved from the nacelle 3 through the generator housing portion 6 to the hub 8. Regarding the rear (left) end of the nacelle 3 rail-element 16 even extends to the outside of the wind turbine 1. It is understood, that the hatch 14 has to be opened i.e. pivoted in an upper position in this case.

It is possible that an alternate loading opening (not shown) may be disposed at the free ending of the hub 8 as well giving a rise to a prolongation of the rail-system 10 from outside one ending of the upper part of the wind turbine 1 through the hub 8, the generator housing portion 6 and the nacelle 3 to the opposite ending of the wind turbine 1.

The extension of the length of the rail-system 10 is achieved by a telescopic mechanism letting the rail-element 16 slide from a rest position within the rail-element 11 towards the rear end of the nacelle 3 and further outside the nacelle 3 until it reaches its final prolonged state (see arrow 23). The extension of the length of the rail-system 10 into the hub 8 is achieved by mounting rail-element 17 to rail-element 11 building a stable connection. Screws or welding can guarantee a secure connection of the rail-elements 11, 17.

Figure 4:
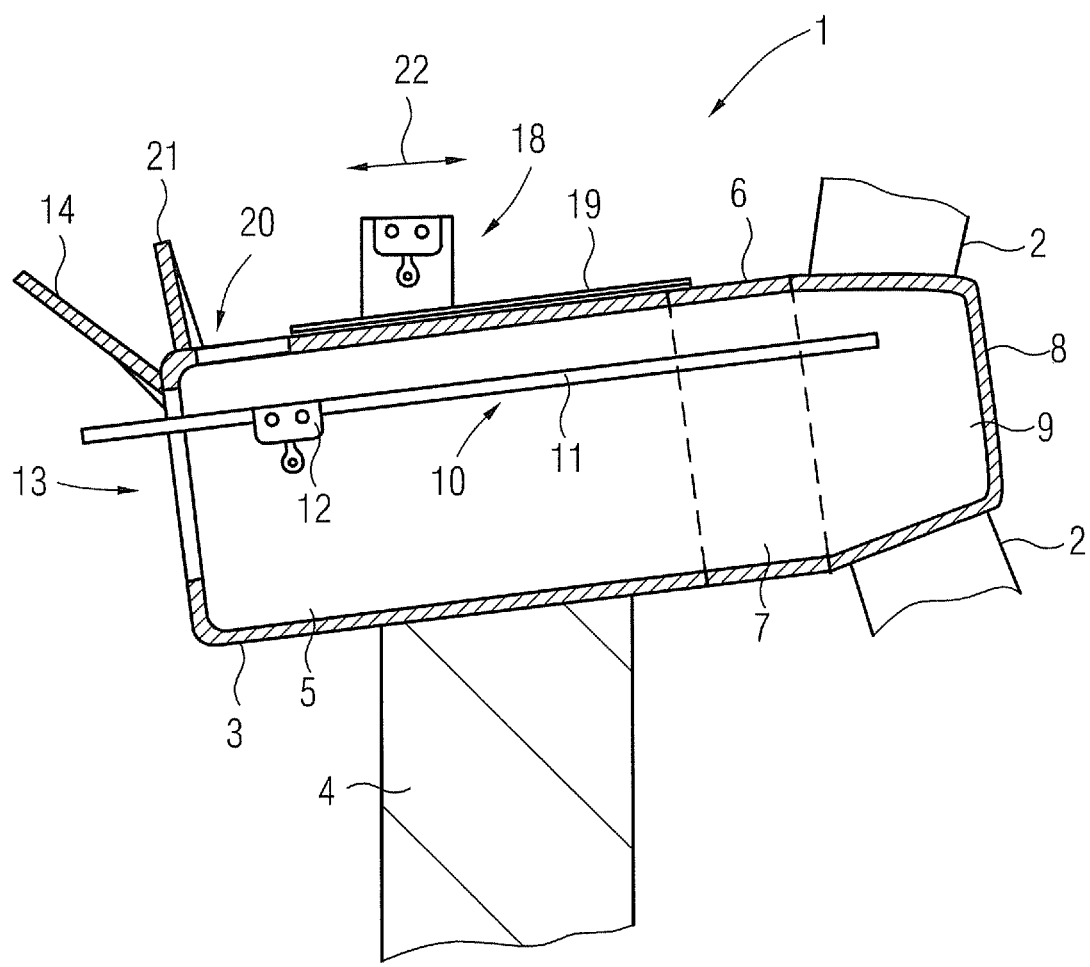
FIG. 4 shows an enlarged principle cut view of the upper part of the wind turbine according to another exemplary embodiment of the invention.

FIG. 4 shows an enlarged principle cut view of the upper part of the wind turbine 1 according another exemplary embodiment of the invention. In comparison to the FIGS. 1, 2 and 3 an additional crane and hoist system 18 is disposed on the outer surface of the nacelle 3 and the generator housing portion 6 being connectable to the rail-system 10. The crane and hoist system 18 may communicate with the means for lifting and/or transporting 12 over loading opening 20 thereby enhancing the degrees of freedom such as the directions of movement of a hoisted or lifted component are increased. The crane and hoist system 18 may be detachably attached to a rail-system 19 allowing axial movements (see arrow 22) of the crane and hoist system 18 on the outer surface of the wind turbine 1, that is the nacelle 3 and the generator housing portion 6. Consequently, it is possible to attach the crane and hoist system 18 only in cases of maintenance of the wind turbine 1. As loading opening 13 is closable by hatch 14, loading opening 20 is closable by a pivotably movable hatch 21.

The invention claimed is:

1. A wind turbine, comprising:
   a nacelle rotatably disposed on a tower comprising a first cavity;
   a generator housing disposed upstream to the nacelle comprising a second cavity;
   a hub disposed upstream to the generator housing comprising a third cavity;
   a rotor blade attached at the hub,
   a rail-system comprising a rail-element that at least partially extends through at least two adjacent cavities; and
   a device for lifting and/or transporting that is movable along the rail-system,
   wherein the first cavity, the second cavity, and the third cavity are configured to communicate with one another, and
   wherein the rail-system extends through the first cavity, the second cavity, and the third cavity.

2. The wind turbine as claimed in claim 1, wherein the device for lifting and/or transporting is detachably attached to the rail-system.

3. The wind turbine as claimed in claim 1, wherein a length of the rail-system is extendable by adding a further rail-elements and/or by a telescopic mechanism.

4. The wind turbine as claimed in claim 1, wherein a loading opening is disposed in or at the nacelle, and/or the generator housing, and/or the hub.

5. The wind turbine as claimed in claim 4, wherein the loading opening is closable by a hatch 6. The wind turbine as claimed in claim 1, wherein the rail-system is extendable outside the wind turbine through a loading opening of the nacelle and/or a loading opening of the hub.

7. The wind turbine as claimed in claim 1, wherein the rail system comprises at least two different slopes.

8. The wind turbine as claimed in claim 1, wherein the device for lifting and/or transporting is collapsible.

9. The wind turbine as claimed in claim 1, wherein the device for lifting and/or transporting is a hoist and/or a crane.

10. The wind turbine as claimed in claim 1, wherein a crane and/or a hoist system is disposed on an outer surface of the nacelle and/or an outer surface of the generator housing and is connectable to the rail system.

\* \* \* \* \*